United States Patent [19]

Geyer, Jr. et al.

[11]  4,289,875

[45]  Sep. 15, 1981

[54] PROCESS FOR CONTINUOUS FILTRATION AND AGING OF XANTHATED ALKALI CELLULOSE

[75] Inventors: Charles J. Geyer, Jr., Berwyn; Ben E. White, Wayne, both of Pa.

[73] Assignee: Fiber Associates, Incorporated, Wayne, Pa.

[21] Appl. No.: 89,129

[22] Filed: Oct. 29, 1979

[51] Int. Cl.$^3$ .............................................. 308B 9/04
[52] U.S. Cl. .................................... 536/60; 210/314; 536/61
[58] Field of Search ...................... 536/60, 61; 210/314

[56] References Cited

U.S. PATENT DOCUMENTS

| | | | |
|---|---|---|---|
| 372,530 | 11/1887 | Franklin | 210/314 |
| 543,922 | 8/1895 | Buckley | 210/314 |
| 828,467 | 8/1906 | Durbrow | 210/314 |
| 1,190,841 | 7/1916 | Almasy et al. | 210/314 |
| 1,558,626 | 10/1925 | Pignal | 210/314 |
| 2,019,944 | 11/1935 | Walch | 536/61 |
| 2,232,326 | 2/1941 | Heim | 536/61 |
| 3,269,540 | 8/1966 | Rosaen | 210/314 |
| 3,474,911 | 10/1969 | Olsen | 210/318 |
| 3,954,621 | 5/1976 | Etani et al. | 210/314 |
| 4,037,039 | 7/1977 | Geyer et al. | 536/60 |

FOREIGN PATENT DOCUMENTS 512904  5/1955  Canada ................................. 536/60

Primary Examiner—Ronald W. Griffin
Attorney, Agent, or Firm—Miller & Prestia

[57] ABSTRACT

A process for the continuous filtration and aging of a viscose solution comprising xanthated alkali cellulose (XAC) is described wherein the XAC is continuously passed in a downstream direction through a series of aging tanks and a series of filter means. The aging tanks are so designed and arranged that the viscose solution is never partitioned into batches, as necessitated by common manufacturing systems, but constitutes a continuous, uninterrupted stream throughout aging filtration, deaeration and spinning. The filter means, standard plate and frame filters, are designed and installed in such a manner that the number of filter changes, or redressings, are substantially reduced in the aggregate, without increasing the number of filters now used in a standard plant, or sacrificing viscose quality. This results in less process interruption, loss of product, and less potential environmental pollution.

13 Claims, 5 Drawing Figures

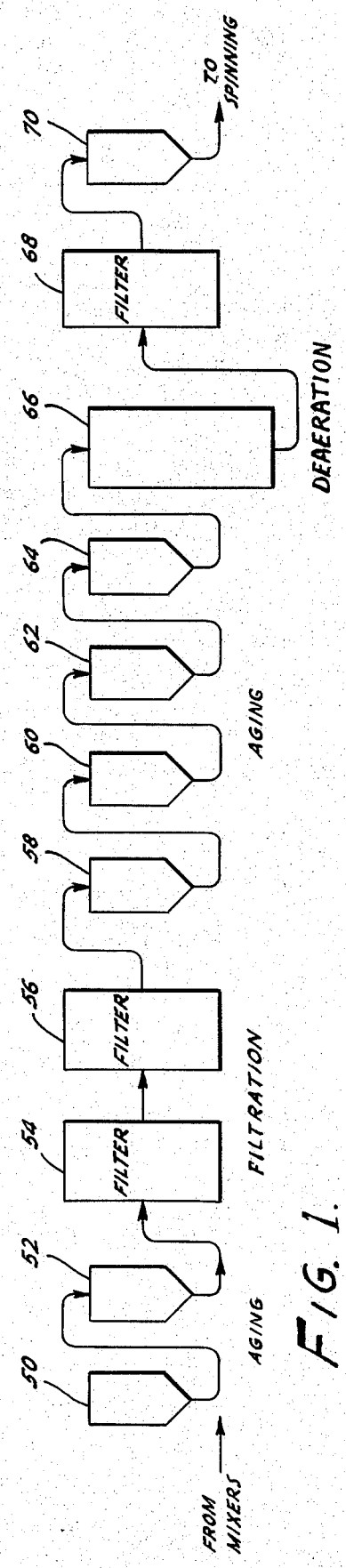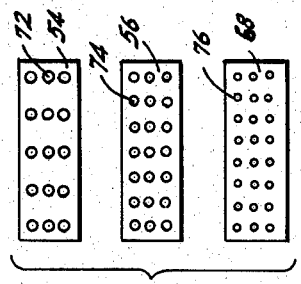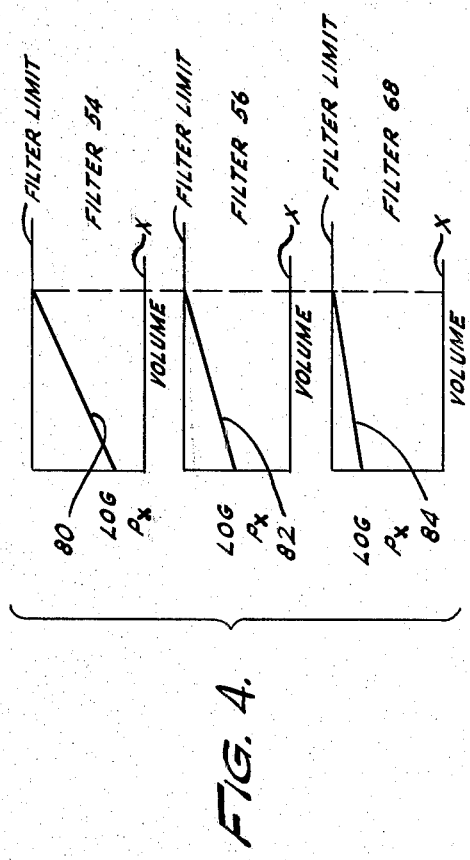

PROCESS FOR CONTINUOUS FILTRATION AND AGING OF XANTHATED ALKALI CELLULOSE

BACKGROUND OF THE INVENTION

This invention pertains to a process for continuously aging and filtering xanthated alkali cellulose (XAC) to form a spinnable viscose solution. The continuous aging and filtration process herein disclosed may be incorporated in conventional batch viscose rayon systems, or may be used in conjunction with the continuous xanthation apparatus and process disclosed in U.S. Pat. No. 4,037,039 (of common inventorship and assignment herewith).

Use of the present invention in conjunction with the continuous process disclosed in the aforementioned patent results in a completely continuous process from the start of xanthation through to spinning. The present invention can be used with current standard batch xanthation and mixing processes, by combining the batches and treating the mixture continuously thereafter.

The economic attractiveness of the process and the quality of the product are greatly enhanced by the use of a continuous process throughout.

Regardless of whether the xanthation process itself is a batch or continuous process, the resulting cellulose xanthate must be filtered to remove insoluble fiber or foreign matter. Prior to spinning, the solution must be deaerated (degassed) and aged (ripened) under controlled temperature conditions, resulting in a partial decomposition and redistribution of the xanthate groups on the cellulose molecules. These chemical reactions cause changes in the state of solution of the cellulose and are an important determinant in the characteristics of the final fiber as well as the efficiency of the spinning process.

Rate of aging is a function of temperature and the chemical composition of the solution. Since fiber properties and spinnability are both affected by the degree of aging, uniformity of aging is of paramount importance in the production of uniform fiber.

Conventional batch aging processes comprise passing viscose through a plurality of tanks maintained at about 18° C. The viscose is filtered from two to four times through this passage which takes approximately 25–100 hours. For each batch movement, pumps have to be actuated in conjunction with the opening and closing of the necessary valves. On emptying each tank, an appreciable volume of viscose is left sticking to the tank because of the highly sticky, viscous nature of viscose. Furthermore, in spinning tanks it is necessary to leave a heel, because if the whole volume is pumped out, air will be reintroduced into the deaerated viscose. All this leads to non-uniformity of treatment among respective batches and possible re-formation of gels after filtration.

Further, in conventional filter systems, the life of the first filter in the series (the most upstream filter as the solution passes in the downstream direction) is usually much shorter by a factor of twenty or more than the other filters in the series due to the high initial gel content of the solution passing therethrough. The other filters become plugged or inoperable at extended cycle times, with the most downstream filter typically lasting the longest, even though the filter medium is much tighter than in earlier filters. Accordingly, the overall process is subject to frequent interruption as the various filter elements of the respective filters have to be cleaned or changed, with each changing or cleaning resulting in many economic and process disadvantages. The most serious problems caused by filter changing are (a) dislodgement into the viscose stream of gels or particles that inevitably stick to the filter plates and frames, valves, pipes, etc., (b) the economic loss of the very appreciable amount of viscose that adheres to filters and filter media, (c) the nuisance and cost of changing and cleaning filters and media, and (d) the stream pollution effect of the viscose washed out of filters and media, or what is even more expensive the neutralization and decomposition of such viscose so that it is no longer harmful to streams.

Having in mind the above-noted disadvantages of batch aging processes heretofore known, it is an object of the present invention to provide a process wherein the viscose solution is uniformly aged by continuous processing means.

With respect to the frequent process interruption caused by frequent filter element change and/or cleaning, it is also an object of the present invention to provide a filtration process wherein the filter life, averaged over all filters, is substantially extended, resulting in fewer total changes for a plant, or section of a plant.

SUMMARY OF THE INVENTION

These objects and others which will be apparent in the course of the subsequent discussion are met, by the aging and filtration process herein described, which comprises providing a constant through-put passage of the XAC solution through a series of aging tanks so that the aging residence time of a given solution fraction is equivalent to the aging residence time of any other given fraction.

Moreover, the series of filter means are designed and installed in a manner which will bring about a substantial reduction in the total number of filter changes per unit of time.

It has been known since at least the late 1930's that the pressure increase across a filter when filtering "gels" from viscose at a constant solution rate, followed a semi-log law. That is: log $P=Kv$ or the log of the pressure drop is equal to the volume filtered times a constant, which constant was characteristic of the particular viscose being filtered. Furthermore, it became known as a logical consequence of the log P vs. volume law, and directly from microscopic examination of viscose gels that while the distribution of gel size is quite large, varying from smallest to largest by a factor of at least 100, probably 1000, the span of the great majority of gels was considerably less than the aperture of a pore in the filter media. This means that screening out of gels was not solely caused by the blockage of passage of a large gel globule by a smaller aperture filter pore. Rather, due to the "sticky" nature of the globules, the determinative factors appear to be the probability of a gel globule touching a side surface of the filter pore and the probability of globule agglomeration with another gel globule affixed to the wall of the pore. Thus, a substantial rate of gel removal may be achieved by one layer of a relatively open porous filter element.

These empirical facts had some significant implications heretofore unrecognized by the viscose industry.

It is the nature of the semi-log P law that pressure builds up exponentially. That is, if it takes a given volume filtered to build up 10 psi, then an additional equal volume will cause an increase of 100 psi. Thus, the amount of viscose passed through a filter before any given pressure limitation was reached was highly sensitive to the starting pressure drop across the filter, designated as Po. If Po could be reduced then the throughput attained before reaching maximum permissible pressure was greatly increased.

For a given viscose composition Po is dependent upon three factors; the rate of flow, the average pore size, and the number of pores. The last two factors can be combined into one description as aggregate pore area, but the pore size and number are independently significant, as will be described later.

Reductions of flow rate to reduce Po would have no practical interest if at the reduced flow it simply took longer to get the same volume through the filter. However, due to the log P nature of the build up a reduction in rate resulted in a larger volume passing the filter before pressure limitations were reached. For instance, if the rate was cut in half, the volume filtered before the pressure limit was reached would be considerably more than twice that attained at the high flow rate.

Considering now the mechanism of gel removal by agglomeration, a number of layers of a relatively open, and therefore low Po, filter media can remove the same percentage of gels as relatively "tight", and therefore high Po, media.

These factors, rate of flow, and pore size can be used independently or together to achieve a longer aggregate filter life, as measured by throughput, and thus fewer filter changes. The reduced filter changes are achieved with no sacrifice in removal of objectionable material.

This invention may be better understood by reference to the subsequent detailed description thereof, taken in conjunction with the appended claims and the figures, wherein:

THE DRAWINGS

FIG. 1 is a schematic diagram of the continuous aging and filtering process of the present invention;

FIG. 2 is a simplified top view showing one embodiment of a filter arrangement in accordance with the invention;

FIG. 3 is a simplified view of a layer of certain filtering elements, depicting various arrangements of pore size and number in accordance with the invention;

FIG. 3A is a simplified top view showing one acceptable filter arrangement in accordance with the invention, using the filter elements shown in FIG. 3, and FIG. 4 comprises graphical representations showing the relationship between the log of the filter pressure Px (Px = pressure differential existing across a filter means after a given volume of solution has been filtered) and the volume of solution passing through each filter as each filter means reaches a filter limit which corresponds to the clogging or plugging of the filter elements of the filter means to such an extent that the elements need changing or cleaning for effective process operation.

Turning now to FIG. 1, there is shown a schematic representation of a continuous aging and filtration process in accordance with the invention. It is to be noted that the process shown in FIG. 1 is ideally adapted for utilization in conjunction with the continuous xanthation and mixing apparatus of U.S. Pat. No. 4,037,039. On the other hand, the process is also well-suited for employment in conjunction with batch xanthation and mixing processes.

With specific reference now to FIG. 1, there is shown a first pair of aging tanks 50, 52 adapted for connection to receive viscose from the xanthate-mixing operation or the post-xanthation mixers of a batch xanthation process. The XAC solution (xanthated alkali cellulose) passed in series through the tanks 50, 52 as well as the other process components shown in FIG. 1 at a uniform throughput rate. These tanks are all relatively tall and relatively small diameter, the total tank capacity being such as to contain the volume required for approximately 25-75 hrs aging at the volume rate required for spinning; i.e., volume of tanks ÷ volume of spinning/hr = 25-75. Within each tank is a set of standard static mixers. Thus a given cross section of a homogeneous viscose passes uniformly through the whole aging-filtration-deaeration process with no static pockets or static areas due to laminar flow. Also, there are perforce, no tank heels or side drainings from emptied tanks so that viscose of widely different ages are intermixed. First filter means 54 is located downstream from tanks 52, with second filter means 56 located downstream of filter means 54. The XAC solution is then passed through aging tanks 58, 60, 62, 64, which are connected in series fashion. After exiting from the downstream exit pipe of tank 64, the XAC is deaerated in deaeration tank 66 and then passed through a third filter means 68. Next, the XAC solution is passed to tank 70 from which it is pumped to the spinning zone. The total residence time of the XAC solution in the aging tanks 50, 52, 58, 60, 62 and 64 is about 25-75 hours with the tanks being maintained at about 18° C. or higher.

The placement of the various tanks and filters is not unique, thus filter 54 of FIG. 1 could come before tank 50, or some of the tanks 58-64 could come between filters 54 and 56. It is desirable if not absolutely necessary that deaeration at 66 occurs just prior to the spinning tank 70 and final filtration at 68 follows after spinning tank 70.

In all prior art apparatuses the total area of filters 54, 56 and 68 were approximately equal. The total rate of viscose flow was then, of course, the same for each. The pore size of the filters usually decreased for filters 54 to 68, that is the filters became tighter. Nonetheless because most gels were removed in the first filtration and very few were left by the third, the first filter 54 would clog very rapidly, the second filter 56 would last longer by an appreciable factor, and the third filter would last perhaps 20 times as long as the first.

However, due to the process herein described, the life of the filter elements of filters 54, 56 and 68 can be approximately the same, but in any event the total number of filter changes (i.e., for filters 54, 56, 68 summed), will be substantially less than normally occurring.

If the viscose is filtered at a constant throughput, then it is known that $$\log \frac{Px}{Po} = KVx$$

wherein Px is the pressure drop across the filter after Vx volume has been filtered, Po is the initial pressure drop across the filter, and K is the constant characteristic of the porosity of the filter and the particular viscose solution being filtered.

It follows from the above equation that, at a constant solution throughput, the pressure differential across any filter (Px) will rise slowly at first as the filter is used. Later, the pressure will rise more rapidly. For example, if the pressure increases 10 psi during the first ten days of filter operation, it will then increase 100 psi during the next ten days of operation.

It is known that all filters have an upper pressure limit which cannot be exceeded without the danger of rupturing the filter.

In FIG. 4, the pressure volume relationship has been graphically represented for the filters 54, 56 and 68 shown in FIG. 1. With reference to the graph corresponding to the filter 54, it can be seen that if the initial pressure drop (Po) is adjusted by lowering the volume rate or the porosity so that it is rather low, the upper pressure limit, or filter limit as shown in the drawings is reached after volume X of the solution has been filtered. The log of pressure (Px) is shown by line 80. Turning now to the graphical representation corresponding to filter 56, if a higher initial pressure is accepted by raising the volume flow rate than that for filter 54, then, as the volume of solution passing through the filter increases, (the line 82 signifying the total pressure differential as a given volume is filtered), pressure gradually increases so that it crosses the filter limit at approximately the same volume X as for the filter 54. With reference to the graph corresponding to filter 68, an even higher rate of flow resulting in the higher pressure difference is set for this filter, and it can be seen that the line 84, representative of Px, for this filter, has a low slope but reaches the filter limit at approximately the same volume as the other filters 54, 56.

In accordance with the invention, the initial pressure differential (Po) for filter 54 is thus set so that it is the lowest of the three filters The initial pressure differential Po for filter 56 is adjusted so that it is somewhat higher than that of filter 54, but less than that of the filter 68. The initial pressure differential Po for filter 68 is set to be higher than either filter 54 or 56. In such manner, the filter element life of all of the filters is made more uniform, as can be shown in the graphical representations, as the filter limit is reached in all cases (filter 54, filter 56, and filter 68) after approximately the same volume (X) of viscose solution being filtered.

However, of much more practical significance the total number of filter changes will be greatly reduced. For instance in an operating mill the first filter may last 2–30 days, the second 60 days, and the third considerably more than a year. This leads to approximately $36+6+0.5=43$ changes per year. With our system a typical pattern of changes per year could be $7+7+7=21$, a reduction of 50%. In actuality the reduction could be considerably more.

Thus, according to the aforementioned process it can be understood that the objects of the present invention are met by controlling the rate of flow per unit area and the porosity and/or number of layers in each filter and thereby initial pressure differential across each said filter means in said series in such a manner as to provide for successively greater initial pressure differentials as said xanthated alkali cellulose passes in said downstream direction through said series of filter means, and thereby decrease the number of required filter changes with no increase in the total number of filters.

Turning now to FIG. 2, one possible filter arrangement for taking advantage of the above pressure Po-filter limit relationship in accordance with the invention is shown. In this instance, the first (most upstream) filter 54 is provided with three filter elements or plates. Filter 56 (the next downstream filter) is provided with two filter elements or plates, and filter 68 is provided with only one plate. The surface area of each plate or element in FIG. 4 is the same. Thus, the total surface area of the filter 54 is 1.5 times that of filter 56 and three times that of filter 68. As the throughput through each of the filter means 54, 56, 68 is constant, the flow rate per unit area varies among the respective filters. Assuming that each plate or element shown in FIG. 4 is about 1 sq. ft., then the flow rate r, for example, through filter means 54 may be 0.5 gallons/sq.ft., the flow rate r, for example, through filter 56 may be 0.75 gallons/sq.ft., and the flow rate r through filter 68 may be 1.5 gallons/sq.ft. The porosity of all of the filter elements, in this instance, is uniform. In this way, the initial pressure differential of filter 54 is regulated so as to be lower than that of filters 56 or 58, and the pressure differential of filter 56 is regulated so that it is less than that of filter 68. In this manner, the filter element life of all of the filters is made more uniform, and as stated above the number of changes is decreased.

Turning now to FIGS. 3 and 3A, other possible filtering arrangements are shown. With respect to FIG. 3, the first filter 54, is provided with large pores 72. The filter 56 is provided with pores 74 of an intermediate size, and the filter 68 is provided with pores of the smallest size. The area of filter element porosity (area of the pore times the number of pores in the filter) can thus be regulated and the Po for each filter can be changed independently of flow rate so that the pressure differential of each filter can be set as desired over a wide range without sacrificing viscose quality or having to increase the total number of filters over that normally used in a conventional plant.

With respect to FIG. 3A, it has been found that the Po values are not appreciably affected when a plurality of filter elements are superimposed or are arranged in a laminate construction for a given filter means. However, the gel removal percentage is increased by such constructions due to the particular nature of gel filtration pertaining to gel adherence to a pore and gel agglomeration, as previously mentioned, in that each laminate layer will remove independently the same percentage of the gels approaching it. As shown, three layers 54a, 54b and 54c, having large pores 72, are provided in the filter means 54. The Po for filter 54 is not adversely affected, and the amount of gels filtered is increased because the solution must pass through three elements, 54a, b, c. Likewise, as shown, filter 56 is composed of a double layer arrangement 56a, 56b with the filter elements 56a, 56b, having intermediate porous openings 74, as shown, in FIG. 3. Filter 68 may be comprised of a single element having very small pores, 76. In this manner, the relationship Po filter 54 < Po filter 56 < Po filter 68 is maintained and the rate of gel filtration is increased.

It is understood that while three filter stages have been illustrated in the example, the application of the invention will apply whether one or more filters are used.

The following example typifies the proposed conditions and expected results in the possible practice of the present invention.

EXAMPLE

A standard viscose with the approximate composition:

9% cellulose
6% NaOH

3% CS$_2$

82% H$_2$O is pumped into the system shown in FIG. 1. The total residence time of the solution in the aging tanks 50, 52, 58, 60, 62, 64 is about 40 hours with the temperature being maintained at about 18° C. in the tanks. Filter 54 is comprised of 3 layers of gauze or equivalent cloth (large pore size) with the Po across filter 54 being about 5 psi. Filter 56 is composed of 3 layers of cotton batting (intermediate pore size) with a Po of about 10 psi. Filter 68 is composed of 2 layers of cotton pulp or equivalent mesh (smallest pore size) with a Po of about 15 psi. In this manner, clogging of the various filter elements is made to occur after approximately the same volume of solution has been filtered.

Various minor modifications and variations of the present invention will be apparent to those skilled in the art. While this invention has been described, for purposes of definiteness and specificity as required by the statute, with respect to specific embodiments and examples, it should be understood that it is not limited thereto and that the appended claims are therefore intended to be construed to encompass those various modifications and variations which may be made in this invention for example, other types of filters of combinations thereof, without departing from the true spirit and scope thereof.

We claim:

1. An improved continuous process for forming cellulose products by the viscose process from a solution of xanthated alkali cellulose, wherein said solution of xanthated alkali cellulose is passed in a downstream direction through a series of filter means, the improvement comprising controlling the rate of flow per unit area whereby each said filter means in said series has a successively greater initial pressure differential as said xanthated alkali cellulose solution passes in said downstream direction through said series of filter means, so that the filter rate is inversely related to the degree of gel removal.

2. A process as defined in claim 1, wherein both initial pressure and fraction of gel removed are set as desired as said xanthated alkali cellulose solution passes downstream through said series of filter means.

3. A process as defined in claim 1, wherein the area of filter element porosity of each said filter means progressively decreases as said solution of xanthated alkali cellulose passes downstream through said series.

4. The process as defined in claim 1 including the step of aging said viscose homogeneously.

5. A process as defined in claim 2 further comprising providing successively greater flow rates per unit area of said filter means for said xanthated alkali cellulose as said xanthated alkali cellulose passes downstream through said series of filter means.

6. A process as defined in claim 1 wherein said series comprises at least two separate filter means, and arranging said first filter means along a process path, arranging said second filter means in a downstream direction from said first filter means and arranging further filter means in a downstream direction from said second filter means, and controlling the initial pressure differentials across each said filter means in said series so that the initial pressure drop increases progressively down the series.

7. A process as defined in claim 1, in which the xanthated alkali cellulose solution is continuously passed through an aging means prior to spinning.

8. A process as defined in claim 7 further comprising providing a plurality of aging tanks in series arrangement and continuously passing xanthated alkali cellulose solution through said series of aging tanks prior to spinning.

9. A process as defined in claim 8 wherein the total residence time of said xanthated alkali cellulose in said aging tanks is about 10–125 hours and said tanks are maintained at a controlled temperature.

10. A process as defined in claim 7 further comprising deaerating said xanthated alkali cellulose prior to spinning.

11. A process as defined in claim 1 wherein each of said filter means includes filter elements having uniform porosity, and said series of filter means is arranged so that successively smaller filter means surface areas are provided as said xanthated alkali cellulose solution passes downstream through said series of filter means.

12. A process as defined in claim 1, wherein the open pore area of each filter means progressively decreases as said xanthated alkali cellulose passes downstream through said series.

13. A process as defined in claim 11 further comprising providing successively greater flow rates per unit area of said filter means for said xanthated alkali cellulose as said alkali cellulose passes downstream through said series of filter means.

* * * * *